March 30, 1954  G. V. WOODLING  2,673,917
HEATING UNIT CONTROL CIRCUIT
Filed Oct. 21, 1948  4 Sheets-Sheet 1

INVENTOR.
George V. Woodling
BY
Woodling and Krost
attys.

March 30, 1954     G. V. WOODLING     2,673,917
HEATING UNIT CONTROL CIRCUIT
Filed Oct. 21, 1948     4 Sheets-Sheet 2

INVENTOR.
George V. Woodling
BY
Woodling and Krost
attys.

March 30, 1954  G. V. WOODLING  2,673,917
HEATING UNIT CONTROL CIRCUIT
Filed Oct. 21, 1948  4 Sheets-Sheet 3

INVENTOR.
George V. Woodling
BY
Woodling and Krost
attys.

March 30, 1954

G. V. WOODLING 2,673,917

HEATING UNIT CONTROL CIRCUIT

Filed Oct. 21, 1948

INVENTOR.
George V. Woodling
BY
Woodling and Krost
attys.

Patented Mar. 30, 1954

2,673,917

UNITED STATES PATENT OFFICE 2,673,917

HEATING UNIT CONTROL CIRCUIT

George V. Woodling, Cleveland, Ohio

Application October 21, 1948, Serial No. 55,791

10 Claims. (Cl. 219—20)

The invention relates in general to electrical heating appliances and more particularly to household heating appliances which may be controlled by a controllable space discharge device and which utilizes a metallic film impedance for the heating element.

An object of the invention is to provide a household electric flatiron with rectified alternating current energy from a rectifier controlled by a temperature responsive impedance in heat exchange relationship with the flatiron.

Another object of the invention is to provide a temperature responsive impedance in heat exchange relationship with a household electrical heating appliance to affect a bridge circuit and thus control a controllable rectifier supplying energy to the appliance, and further to place such impedance in circuit relation with the energy output of the rectifier.

Another object of the invention is to provide a household electric heating appliance wherein the heating element is a metallic resistor film deposited on a dielectric coating which is in turn supported by a metal carrier.

A still further object of the invention is to provide a household electric appliance adapted to be heated by a metallic film heating element with such film deposited on a dielectric coating and wherein the metallic film is supplied with electrical energy from a controllable rectifier, and a control circuit has a temperature responsive impedance in heat exchange relationship with the heating element to control the controllable rectifier.

A still further object of the invention is to provide a household electric appliance adapted to be heated by a heating element supplied with electrical energy from a controllable rectifier, and a control circuit has a temperature responsive element in heat exchange relationship with the heating element to control the controllable rectifier, and wherein either or both of the elements may be a metallic film.

Figures 1, 2, 3, 5:
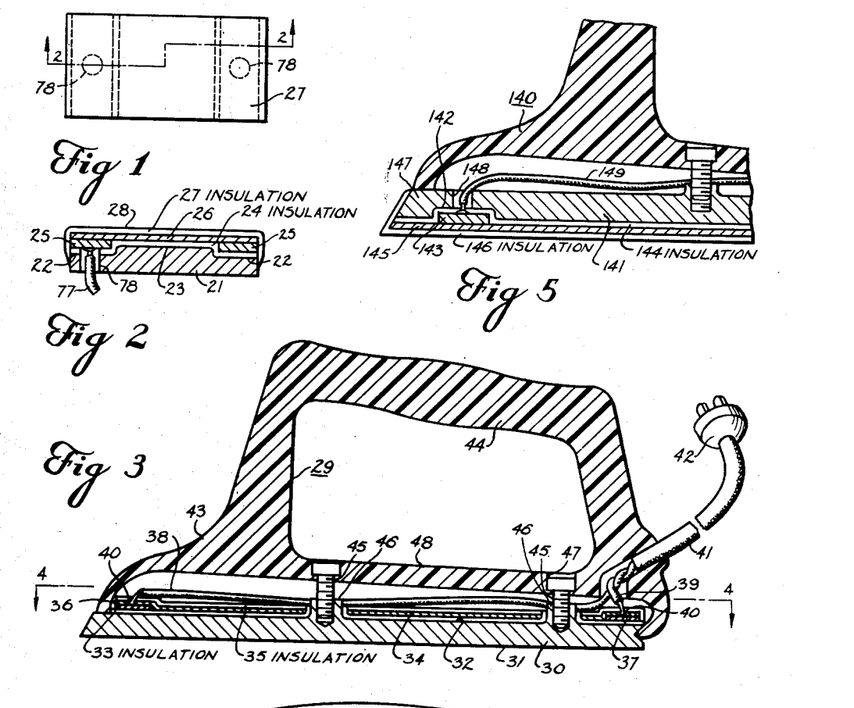
Figure 1 is a plan view of a metallic carrier supporting a dielectric coating which in turn supports a metallic film impedance used as a heating element.
Figure 2 is a cross-sectional view of Figure 1 showing the metallic film in exaggerated thickness.
Figure 3 is a sectional elevational view of a flatiron incorporating a metallic film heating element.
Figure 5 is a partial sectional elevational view of a modified form of flatiron incorporating a metallic film impedance.

Figures 1 and 2 illustrate one form of the invention wherein a metallic carrier 21 has recessed portions 22 and and the entire upper surface 23 is covered with a dielectric or vitreous enamel coating 24. Terminal plates 25 are adapted to be attached or imbedded in the dielectric coating 24 at the recessed portions 22 and remain fixedly in place. A metallic film impedance 26 is adapted to be deposited in any well-known manner upon the dielectric coating 24 and terminal plates 25. A second dielectric coating 27 is adapted to cover the metallic film impedance 26 and to extend down over the sides to the metallic carrier 21 to act as electrical insulation and mechanical protection to the metallic film impedance 26. The manner of applying the metallic film impedance and the manner of applying and type of dielectric coating does not form part of the invention. The upper surface 28 of the second dielectric coating 27 is preferably made of a smooth surface so that the entire heating unit may be more satisfactorily utilized; for instance, the heating unit might be used as a hot plate or other appliance wherein a smooth working surface would be desirable. Electrical connection to the metallic film impedance is made by the terminal plates 25 since these terminal plates are directly in contact with the metallic film impedance 26. Terminal wires 77 may be attached to the terminal plates by any well-known means such as soldering or brazing, and in the Figures 1 and 2 have been shown as being attached to the underside of the terminal plates 25 and gaining access to such terminal plates through holes 78 in the metallic carrier 21.

The Figure 2 shows the layers of dielectric coating and metallic film in cross section and it is to be understood that this cross-sectional view is considerably exaggerated, especially as to the thickness of the metallic film impedance.

Figure 4:
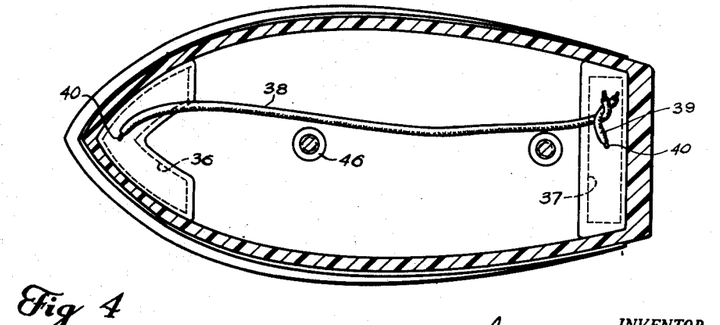
Figure 4 is a sectional plan view taken on the line 4—4 of Figure 3.

The Figures 3 and 4 show a metallic film impedance as applied to a household heating appliance shown as an electric flatiron 29. The flatiron 29 includes a metal soleplate 30 having a working surface 31 and an opposite surface 32. A dielectric coating such as a vitreous enamel coating 33 is adapted to cover the opposite surface 32 of the metal soleplate 30 to act as an insulator. Such dielectric or vitreous enamel coating 33 may be applied in liquid state and may be such coating that is fired to a hard, glossy surface covering the opposite surface 32. A metallic film impedance 34 may be deposited on the dielectric coating 33 as the heating element of the flatiron 29. A second dielectric coating 35 covers the metallic film impedance 34 to provide physical protection to the metallic film impedance 34 and to act as an electrical and heat insulator. The heating element may be made in substantially the same manner as is used in the trade in making thin metallic film resistors. The vitreous enamel physically protects the thin metal resistor film from abrasion and moisture. With this type of construction, the entire electrical appliance may be washed without damage to the heating element and thus is rendered sanitary. The resistor film may have zero, negative or positive temperature coefficient. Metal terminal plates 36 and 37 have been shown at the toe and heel portions of the flatiron 29 to provide electrical connection to the metallic film impedance 34. These metal terminal plates 36 and 37 have been shown as being placed on the first dielectric coating 33 whereupon the metallic film impedance 34 is deposited on these metal terminal plates as well as on the first dielectric coating 33. The metal terminal plates 36 and 37 provide sufficient thickness of metal to provide electrical connection to the wires 38 and 39 such as by soldering or brazing at the terminals 40. The wires 38 and 39 may be joined into a cable 41 having a conventional male electrical plug 42.

A solid heat insulating cover 43 may cover the entire opposite surface 32 of the soleplate 30. This cover 43 may be of any solid insulator such as a plastic or any other well-known insulating substance. The cover 43 has a handle portion 44. The cover 43 is adapted to be fastened to the soleplate 30 by cap screws 45 which threadedly engage projecting lugs 46 on the opposite surface 32 of the soleplate 30 and preferably the cap screws 45 are recessed in the cover 43 as at 47.

The flatiron shown in Figures 3 and 4 is an improved form of flatiron since the use of the metallic film impedance 34 permits lightweight construction of the flatiron, and also permits a minimum thickness between the working surface 31 and the upper surface 48 of the cover 43.

The Figure 5 shows a portion of a flatiron 140 that differs in some particulars from the flatiron 29 of Figures 3 and 4. A plate 141 may be made of metal as is the usual custom and has a recess 142 to receive a terminal plate 143. Between the terminal plate 143 and the recess 142 is a dielectric coating 144 which completely covers the lower surface of the plate 141. A metallic film impedance 145 is deposited on the dielectric coating 144 and is, hence, in electrical contact with the terminal plate 143. A second dielectric coating 146 is deposited on the metallic film impedance 145 and also preferably covers the toe portion 147 of the plate 141 as well as the entire side edges of the plate 141, for electrical insulation and for mechanical protection to the metallic film impedance 145. By providing a flat surface to the first dielectric coating 144 the metallic film impedance 145 and the second dielectric coating 146 will also have a flat surface to thus provide a smooth working surface for the flatiron 140. Such flat surface may be obtained by grinding or other suitable method to eliminate any unevenness. A hole 148 is provided in the plate 141 so that a terminal wire 149 may gain access to the terminal plate 143 and be electrically connected thereto in any suitable manner.

Figures 6, 7:
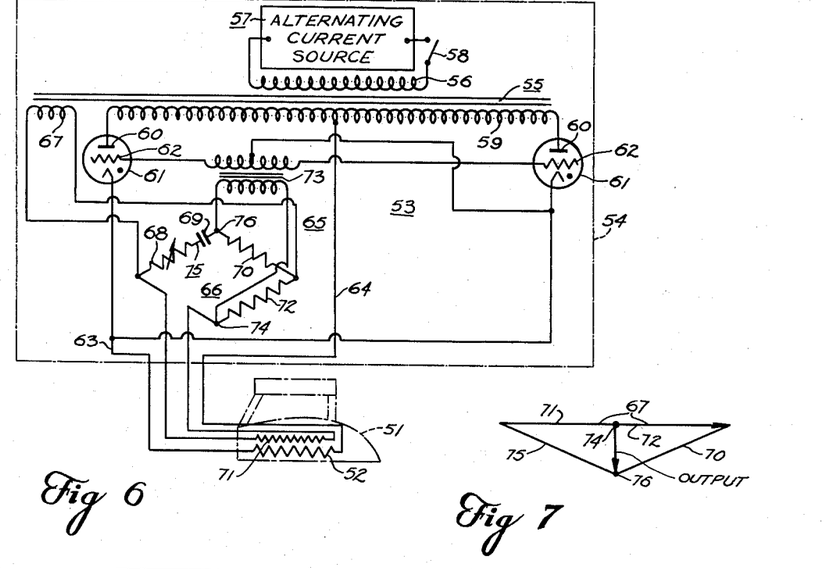
Figure 6 is a circuit diagram of a controllable supply circuit for the heating element.
Figure 7 is a vector diagram of the voltages obtainable from the circuit of Figure 6.

The circuit of Figure 6 shows an energization circuit 53 which may be controlled in electrical output for energizing the heating element of a household electrical appliance. A household heating appliance 51 has been shown in dotted lines to indicate a flatiron having a heating element 52. The energization circuit 53 is preferably housed in a separate housing as indicated by the dashed line 54. The energization circuit 53 includes generally a transformer 55 having a primary 56 energizable from an alternating current source 57 through the switch 58. A secondary 59 of the transformer 55 energizes the anodes 60 of space discharge devices 61. These space discharge devices have been shown as gaseous discharge tubes having a control element such as control grids 62. The space discharge devices have been shown as constituting a full wave rectifier system having a rectified alternating current output deliverable across the output terminals 63 and 64. The rectified output of the rectifiers 61 is delivered to the heating element 52 for energization thereof.

The energization circuit 53 also includes a control circuit 65 having a phase shift bridge 66 energized from a transformer winding 67. The phase shift bridge 66 has four arms with the first arm 75 including a manually variable resistance 68 and a capacitive element 69. The second arm includes an impedance 70 shown as a resistance. The third arm is a temperature responsive impedance 71 that is shown in heat exchange relationship with the heating element 52. In this case, the temperature responsive impedance 71 is shown as being enclosed within the confines of the flatiron 51. The fourth arm of the bridge 66 includes another impedance shown as a resistance 72. The output of the bridge 66 at terminals 74 and 76 is supplied to a grid transformer 73 to variably shift the phase of the grid-cathode voltage relative to the anode-cathode voltage of the space discharge devices 61.

The vector diagram of Figure 7 may be referred to as an aid in understanding the operation of the circuit of Figure 6. In all the following vector diagrams the voltage vectors will be given a reference character corresponding to the reference character of the voltage source or impedance across which the voltage drop occurs. Similarly, a point potential will be given a reference character corresponding to the reference character of the terminal, juncture or point in the circuit. The vector 67 designates the alternating current input voltage to the bridge 66 which will be in phase with the alternating current voltage applied to the anodes 60. The vectors 71 and 72 lie along the vector 67. The juncture 74 between the impedances 71 and 72 is shown as the point 74 on the vector diagram of Figure 7. The juncture 76 between the capacitance element 69 and impedance 70 is shown on the vector diagram by the reference character 76. The first arm 75 of the bridge 66 which includes the variable resistance 68 and the capacitance element 69 is shown on the vector diagram of Figure 7 by the vector 75. Similarly, the impedance 70 has a vector 70 on the vector diagram. The output voltage of the phase shift bridge 66 that is applied to the grid transformer 73 is shown by the vector output. The direction of the vector shown on this vector diagram indicates that the output voltage lags the input voltage 67 by an angle approximately 90 degrees. This would permit the rectifiers 61 to trigger or fire at a time phase 90 degrees lagging the anode-cathode voltage. The variable resistance 68 may be manually adjusted to shift the location of the point 76 to thus adjust the firing angle of the space discharge device 61 and hence adjust the rectified output to the heating element 52. The temperature responsive impedance 71 which is in heat exchange relationship with the heating element 52 should have a positive temperature coefficient such that as the heating element 52 tends to overheat, the impedance of the temperature responsive impedance 71 will increase to decrease the firing angle of the rectifier 61 and hence decrease the electrical output to the heating element 52. Thus, the phase shift bridge 66 of the control circuit 65 maintains a substantially constant temperature of the heating element 52.

Figure 8:
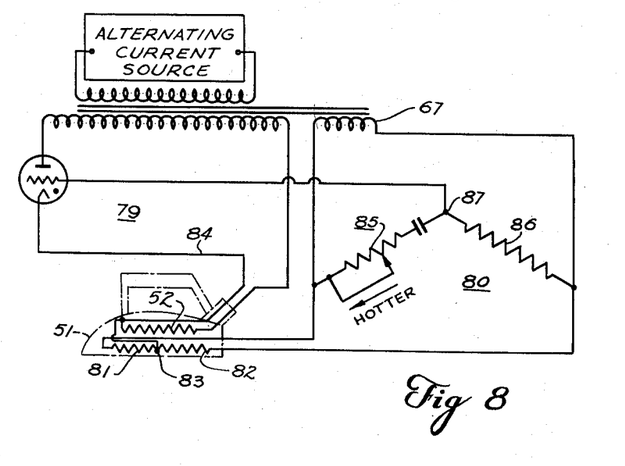
Figure 8 is another controllable supply circuit for the heating element.

Figure 8 shows a modification of the energization circuit of Figure 6. In this case, the rectifier circuit has been shown as a half wave rectifier circuit 79 that supplies energy to the heating element 52 of a heating appliance 51 which has again been shown as a flatiron. A transformer winding 67 again supplies energy to a phase shift bridge 80. This phase shift bridge 80 is shown as having first and second temperature responsive impedances 81 and 82 positioned in heat exchange relationship with the heating element 52. The juncture 83 between the impedances 81 and 82 is connected to one line 84 of the rectifier circuit 79. The connection between this juncture 83 and the line 84 has been shown as being made within the flatiron 51 in order that only four wires need be connected to the flatiron 51. The phase shift bridge 80 has first and second arms 85 and 86 with a juncture 87 therebetween. The output of the bridge 80 is between the junctures 83 and 87 and applied to the cathode and grid of the rectifier of the rectifier circuit 79. The first temperature responsive impedance 81 preferably has a positive temperature coefficient and the second temperature responsive impedance 82, a negative temperature coefficient. By so providing positive and negative temperature coefficients the bridge 80 will be approximately twice as sensitive as the bridge 66 of the circuit of Figure 6. It will be obvious that the first temperature responsive impedance may have any given temperature coefficient and the circuit will operate properly if the second temperature responsive impedance 82 has a temperature coefficient that is more negative or less positive than said given temperature coefficient.

The vector diagram for the circuit of Figure 8 will be essentially the same as the vector diagram of Figure 7 except that there will be two temperature responsive impedances that vary with temperature changes rather than only one.

Figure 9:
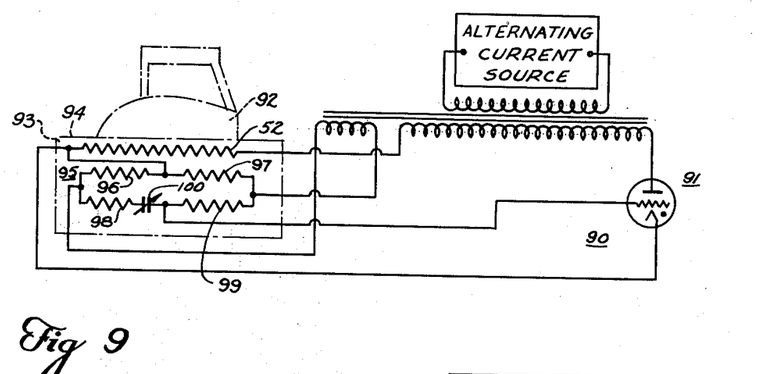
Figure 9 is a further modification of a controllable supply circuit.

The circuit of Figure 9 shows a still further modification of a controllable energization circuit 90 having a half wave rectifier circuit 91. In this case, the heating element 52 is again supplied with energy from the rectifier circuit 91, but the heating element 52 is not in the household appliance which has been shown as a cordless flatiron 92. The heating element is mounted within a container 93. The container 93 may be considered as a hot plate for heating the appliance or flatiron 92 and maintaining same at a substantially constant temperature as long as this flatiron 92 is in contact with the hot plate surface 94 of the container 93. The arrangement shown in the circuit of Figure 9 may well be used for cordless automatic flatirons or as a heating surface for any type of appliance such as a hot plate, oven or grill of a stove. The controllable energization circuit 90 includes a phase shift bridge 95 having four arms 96, 97, 98 and 99, all of which have been shown as being in heat exchange relationship with the heating element 52 within the container 93. In order to make this phase shift bridge 95 as sensitive as possible, the impedances of the first and fourth arms 96 and 99 should have a positive temperature coefficient, and the impedances of the second and third arms 97 and 98 should have a negative temperature coefficient. The vector diagram for the circuit of Figure 9 will be essentially the same as the vector diagram shown in Figure 7 except that all four impedances of the bridge are temperature responsive in order to make the bridge 95 approximately four times as sensitive as the bridge 66 of the circuit of Figure 6. The arm 98 is shown as having a variable condenser 100 therein to permit manual adjustment of the operating temperature of the heating element 52. Obviously, a variable resistor may be utilized for this purpose as in circuits described above; however, the variable condenser may have advantages of not being affected by the heat produced in the container 93 since it will have no movable contact surfaces as is the usual case with variable resistors. Further, the variable condenser may have a temperature coefficient other than zero, and a negative temperature coefficient would still further increase the sensitivity of the bridge 95.

Figure 10:
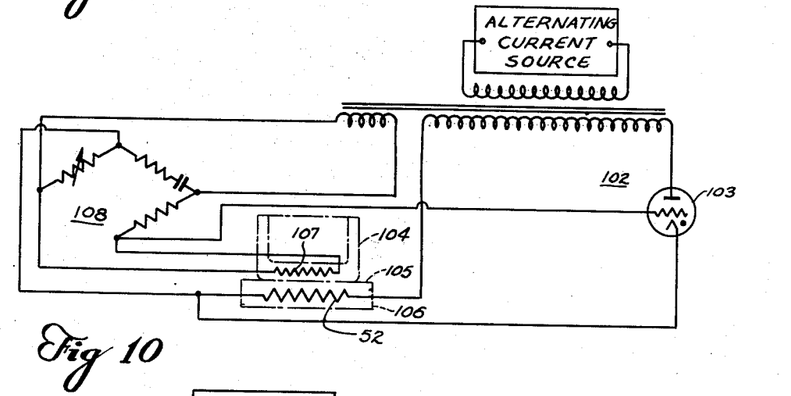
Figures 10 and 11 are still further modifications of a controllable supply circuit.

The circuit of Figure 10 also shows a controllable energization circuit 102 having a rectifier 103 for supplying rectified alternating current energy to the heating element 52. A household appliance 104 has been shown as a cooking vessel adapted to be placed in heat exchange relationship with the heating element 52 as by placing this cooking vessel 104 on a heating surface 105 of a container 106 which contains the heating element 52. The cooking vessel 104 has been shown as having a control impedance 107 incorporated into this cooking vessel 104 which control impedance 107 is one arm of a phase shift bridge 108. The bridge 108 controls the firing angle of the rectifier 103. The control impedance 107 has a temperature coefficient other than zero in order to control the output of the phase shift bridge 108 and, hence, control the output of the rectifier 103. In the circuit as shown, the control impedance 107 should have a negative temperature coefficient. The control impedance may take many forms and preferably is a metallic film impedance such as shown in the Figures 1–5. Metallic film impedances have been developed which may have the temperature coefficient thereof controlled to a very high degree and thus a metallic film impedance having a very large positive or negative temperature coefficient may be selected for use as the control impedance 107. Such a metallic film impedance may be incorporated into the household appliance 104 in a manner similar to that shown in Figures 1 and 2 or the method shown in Figures 3, 4 and 5. Electrical connections to such metallic film impedance may be easily effected and these connections and the metallic film impedance themselves could be made water-tight and to present a smooth surface so that the household appliance 104 may easily be washed and kept in a sanitary condition.

Figure 11:
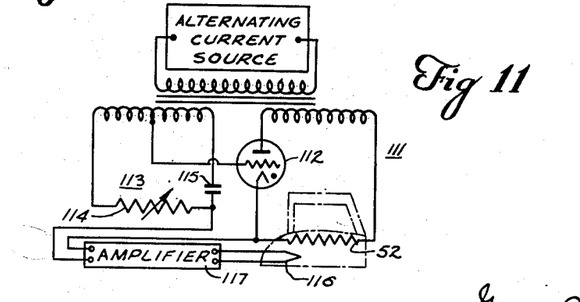

The circuit of Figure 11 shows a still further energization circuit 111 wherein a controllable rectifier 112 supplies rectified alternating current energy to a heating element 52. The rectifier 112 is controlled by a control circuit 113 which includes a fixed phase shift supplied by the resistance 114 and the capacitance 115. The resistance 114 has been shown as being variable to vary the output of the rectifier 112. A thermocouple 116 has been shown as being in heat exchange relationship with the heating element 52, and the output of this thermocouple 116 is supplied to an amplifier 117 which amplifies the voltage obtained from the thermocouple 116 and applies it to the rectifier 112. The controllable rectifier 112 is controlled by a system known as a D. C. bias-A. C. rider system wherein the resistance and capacitance 114 and 115 supply a fixed phase shift of approximately 90 degrees lagging the anode voltage and the amplified voltage from the thermocouple supplies a variable direct current for varying the firing angle of the rectifier 112. The thermocouple 116 has been shown as being mounted within the heating appliance in close proximity to the heating element 52 so that it is in heat exchange relationship with this heating element 52. It will be obvious that this thermocouple 116 may be mounted in a separate unit such as the arrangement shown in Figure 10.

Figures 12, 14:
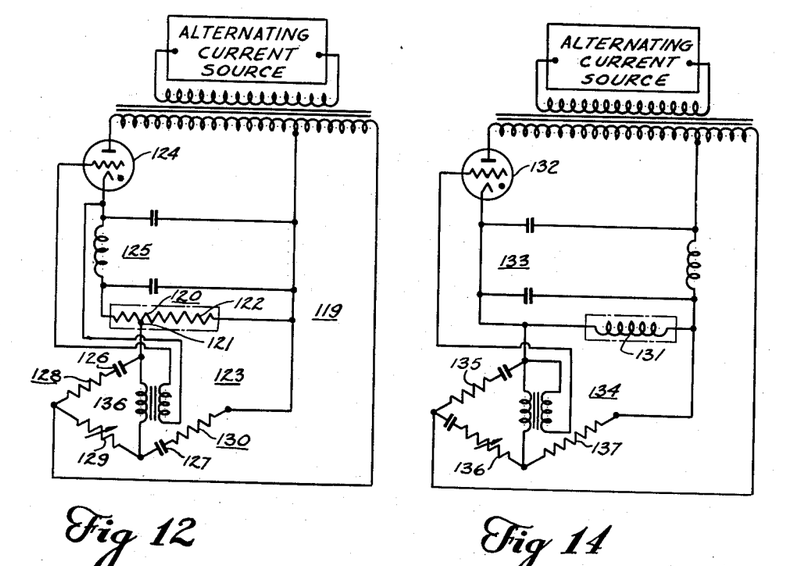
Figure 12 is a circuit diagram of a controllable energization circuit which incorporates a portion of the heating element in the phase shift bridge control circuit.
Figure 14 is a modification of the circuit of Figure 12.

The circuit of Figure 12 shows a still further controllable energization circuit 119 for supplying rectified alternating current energy to a heating element 120. The heating element 120 has an intermediate terminal 121, and the right-hand portion 122 of the heating element 120 serves the dual function of a portion of the heating element and also as one arm of a phase shift bridge 123. The controllable energization circuit 119 includes a rectifier device 124 for supplying the rectified current to the heating element 120 and this rectified alternating current is preferably filtered by a filter 125 so as to apply essentially pure direct current to the heating element 120. The phase shift bridge 123 has condensers 126 and 127 in two arms 128 and 130 of this bridge 123 to prevent the direct current from flowing in this bridge 12. The alternating current impedance of the right-hand portion 122 will then be that used as one arm of the bridge 123.

Figure 13:
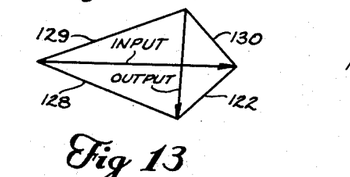
Figure 13 is a vector diagram of the vectors obtainable from the circuit of Figure 12.

The vector diagram of Figure 13 shows the vectors obtainable from the circuit of Figure 12. The first arm 128 of the bridge 123 is shown by the vector 128, and likewise the second and third arms 129 and 130 are shown by the vectors 129 and 130. The input voltage to the phase shift bridge 123 is shown by the vector input and the output voltage of the bridge 123 is shown by the vector output. The right-hand portion 122 of the heating element 120 should be responsive to temperature changes and, in the circuit as shown, should have a positive temperature coefficient to make a stable circuit. The second arm 129 has been shown as being variable in order to adjust the output of the rectifier 124 and hence the temperature of the heating element 120.

The heating element 120 may be constructed of a metallic film impedance with an intermediate terminal connected thereto in order to supply an electrical connection as at the intermediate terminal 121.

The circuit of Figure 14 shows an improvement over the circuit of Figure 12 wherein only two leads are required to the heating element 131. The heating element 131 is again supplied with rectified alternating current energy from a rectifier 132 as filtered by a filter 133. The heating element 131 has been shown as being inductive which will not impede the flow of the direct current from the rectifier 132; however, it will impede the flow of alternating current applied to it from a phase shift bridge 134. This phase shift bridge 134 includes first, second and third arms 135, 136 and 137, and the heating element 131 constitutes the fourth arm of this bridge 134.

Figure 15:
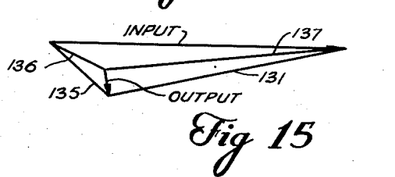
Figure 15 is a vector diagram of the vectors obtainable from the circuit of Figure 14.

The vector diagram of Figure 15 shows the vectors obtainable from the bridge 134 wherein the arm 131 may have a high alternating current impedance relative to the first and second arms 135 and 136, and hence this bridge 134 may be made quite sensitive. An advantage of the circuit of Figure 14 is that the heating element 131 performs the dual function of heating and control of the rectifier 132. No intermediate terminals are needed and hence merely the two end terminals of the heating element 131 need exist. The heating element 131 would thus be desirable for a portable heating appliance such as a flatiron which may then have merely the two normal wires for electrical connection to such heating element and need not have any extra wires or any separate control impedance.

Figure 16:
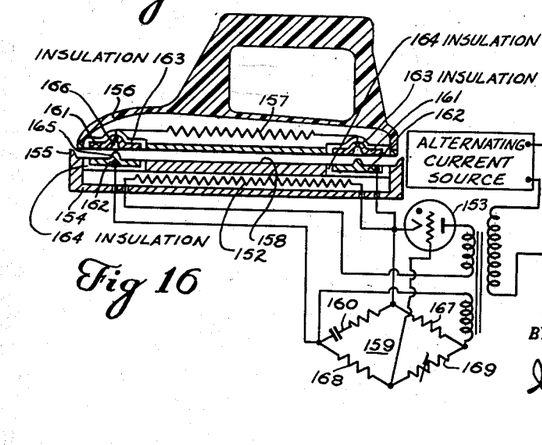
Figure 16 is a controllable energization circuit for a heating appliance having a control impedance in the heating appliance.

Figure 16 is a further modification of the invention wherein a heating element 152 is supplied with rectified alternating current energy from the rectifier 153. The heating element 152 is adapted to be mounted in a base unit 154 which may have ears 155 as an aid in centering the flatiron 156 on the base unit 154. The flatiron 156 has a control impedance 157 contained therein and adapted to be in heat exchange relationship with the heating element 152 when the flatiron 156 is placed on a heating surface 158 on the base unit 154. The rectifier 153 has a bridge circuit 159 for control of the rectifier 153 and the control impedance 157 is adapted to be placed in parallel with one arm 160 of the bridge circuit 159. The electrical connection between the control impedance 157 and the bridge circuit 159 is provided by terminal plates 161 in the flatiron 156 and terminal plates 162 in the base unit 154. The terminal plates 161 are electrically insulated from the flatiron 156 by insulators 163 and the terminal plates 162 are insulated from the base unit 154 by insulators 164. The terminal plates 161 and 162 may make electrical connection by surface contact or preferably by a plug and jack connection 165 and 166.

When the flatiron is placed upon the heating surface 158 so that the terminal plates 161 and 162 are in electrical contact, then the control impedance 157 is in parallel with the arm 160 to reduce the total impedance in this arm of the bridge circuit 159. This is arranged to cause the phase of the grid-cathode voltage to lag to a greater degree the phase of the anode-cathode voltage of the rectifier 153. This will reduce the electrical output of the rectifier 153 and reduce the heat produced by the heating element 152. A fourth arm 169 of the bridge 159 is made adjustable to provide for the manual variation of the operation temperature of the flatiron 156. This will be the case when the flatiron 156 is in heat exchange relationship with the heating element 152 and the control impedance 157 is part of the bridge circuit 159. When the flatiron 156 is removed from the base unit 154, the control impedance 157 will no longer be in parallel with the arm 160 and, hence, the impedance of such arm will increase to increase the electrical output of the rectifier 153. The heating element 152 will then raise in temperature in accordance with the increased electrical input thereto. When the flatiron 156 is again placed on the base unit 152, the control impedance 157 will be in shunt with the arm 160 to reduce the output of the rectifier 153 to a value which will produce the desired temperature setting as dictated by the variable arm 169. However, the stored heat in the base unit 152 will rapidly raise the temperature of the flatiron 156 to this operating temperature. The control impedance 157 should preferably be of a negative temperature coefficient so that it will have a regulating effect upon the operation of the bridge circuit 159 and rectifier 153. Second and third arms 167 and 168 of the bridge 159 may have a positive temperature coefficient to control the bridge 159 when the flatiron 156 is removed from the base unit 154 and hence control the temperature of the base unit 152, and in such case the arms 167 and 168 should be in heat exchange relationship with the base unit 152.

Figure 17:
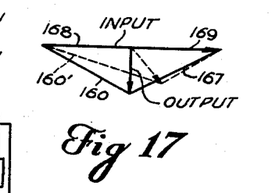
Figure 17 is a vector diagram of the vectors obtainable from the circuit of Figure 16.

The Figure 17 shows the vector diagram for the circuit of Figure 16 wherein 160 is the voltage vector for the arm 160 and output is the output voltage of the bridge circuit 159. When the control impedance 157 is not in shunt with the arm 160, the impedance of the arm 160 will increase to that shown by the dotted line vector 160' and the output voltage will shift to a position less lagging with respect to the input voltage.

Any of the temperature responsive elements 71, 81, 82, 96, 87, 98, 99, 116, 122, 131, 157, 167, and 168, just as the sensing element 107, may be in the form of a metallic impedance film, and constructed similarly to that shown in Figures 1 to 5, either as an individual film or in combination with a separate film as the heating element.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electronic tube control for a household electric heating appliance, comprising a housing separate from said appliance, a gaseous grid controlled rectifier mounted in said housing and having an input and an output, means for connecting said input to an alternating current source, means for connecting the output of said rectifier to a heating element of said appliance, a phase shift bridge circuit having input and output means, means for energizing the input means of said bridge circuit from said alternating current source, means for connecting the output means of said bridge circuit to said controlled rectifier to control the output thereof, said bridge circuit having four arms, one of said arms having an impedance element responsive to temperature changes, and means for placing said one arm in electrical circuit relation with the output of said rectifier, one of said elements being a metallic film impedance.

2. An electronic tube control for a household electric heating appliance, comprising a housing separate from said appliance, a gaseous grid controlled rectifier mounted in said housing and having an input and an output, means for connecting said input to an alternating current source, means for connecting the output of said rectifier to a heating element of said appliance, said heating element being a metallic film impedance, a phase shift bridge circuit having input and output means, means for energizing the input means of said bridge circuit from said alternating current source, means for connecting the output means of said bridge circuit to said controlled rectifier to control the output thereof, said bridge circuit having four arms, two of said arms having a metallic film impedance responsive to temperature changes with each having a different temperature coefficient of impedance, and means for placing said two arms in heat exchange relationship with said heating element.

3. An electronic tube control for a household electric flatiron, comprising a housing separate from said flatiron, a gaseous grid controlled rectifier mounted in said housing and having an input and an output, means for connecting said input to an alternating current source, means for connecting the output of said rectifier to a heating element of said flatiron, said heating element being a metallic film impedance, a phase shift bridge circuit having input and output means, means for energizing the input means of said bridge circuit from said alternating current source, means for connecting the output means of said bridge circuit to said controlled rectifier to control the output thereof, said bridge circuit having four arms, two of said arms having an impedance responsive to temperature changes with each having a different temperature coefficient of impedance, and means for placing said two arms in heat exchange relationship with said flatiron.

4. A household electric heating appliance having a heating element, comprising a metal plate having a work surface and an opposite surface and having first and second terminal portions, a vitreous coating covering one surface of said metal plate, a metallic resistance film deposited on said vitreous coating having an area substantially the same as said metal plate, a second vitreous coating covering said metallic film, means for providing electrical connection to said metallic film at said first and second terminal portions, a housing separate from said appliance, a controllable space discharge device mounted in said housing and having an input and an output, means for connecting said input to an alternating current source, means for connecting the output of said space discharge device to said metallic film, a control circuit having input and output means, means for energizing the input means of said control circuit from said alternating current source, means for connecting the output means of said control circuit to said controllable space discharge device to control the output thereof, said control circuit having a temperature responsive impedance in heat exchange relationship with said appliance.

5. A household electric flatiron, comprising a metal soleplate having a work surface and an opposite surface and having heel and toe portions, a vitreous coating covering said opposite surface of said soleplate, a metallic resistance film deposited on said vitreous coating having an area substantially the same as said soleplate, a second vitreous coating covering said metallic film, a solid heat-insulating cover substantially covering said second vitreous coating, means for providing electrical connection to said metallic film at said heel and toe portions, first and second lugs projecting from said opposite surface, a handle fastened to said first and second lugs, a housing separate from said flatiron, a gaseous grid controlled rectifier mounted in said housing and having an input and an output, means for connecting said input to an alternating current source, means for connecting the output of said rectifier to said flatiron, a phase shift bridge circuit having input and output means, means for energizing the input means of said bridge circuit from said alternating current source, means for connect the output means of said bridge circuit to said controlled rectifier to control the output thereof, said bridge circuit having four arms, one of said arms having an impedance responsive to temperature changes, and means for placing said one arm in heat exchange relationship with said flatiron.

6. An electronic tube control for a household electric heating appliance, comprising a housing separate from said appliance, a gaseous grid controlled rectifier mounted in said housing and having an input and an output, means for connecting said input to an alternating current source, means for filtering the rectified output of said rectifier, means for applying the rectified and filtered rectifier output to a heating element of said appliance, a phase shift bridge circuit having input and output means, means for energizing the input means of said bridge circuit from said alternating current source, means for connecting the output means of said bridge circuit to said controlled rectifier to control the output thereof, said bridge circuit having at least one arm, said at least one arm including in electrical circuit relationship at least a part of said heating element, said at least a part of said heating element having an appreciable, temperature coefficient of impedance, whereby the majority of power applied to said heating element is derived from said rectifier rather than said bridge circuit.

7. A control circuit for an electrical apparatus, comprising a controllable rectifier having an input and an output, means for connecting said input to an alternating current source, means for applying the rectifier output to an electrical power consuming circuit element of said apparatus to pass rectified current therethrough, a phase shift bridge circuit having input and output means, means for energizing the input means of said bridge circuit from said alternating current source, means for connecting the output means of said bridge circuit to said controllable rectifier to control the output thereof, said bridge circuit having at least one arm, said at least one arm including in electrical circuit relationship at least a part of said circuit element, means for preventing the alternating current component of said rectifier output from influencing the performance of said bridge circuit, said at least a part of said circuit element having an appreciable temperature coefficient of impedance to control said rectifier, whereby the majority of power applied to said circuit element is derived from said rectifier rather than said bridge circuit.

8. A control circuit for a heating element comprising an alternating current bridge having pairs of input and output terminals, a rectifier device having alternating current input means and direct current output means, means for connecting said alternating current input means of said rectifier device to an alternating current source, means for connecting said direct current output means of said rectifier device to said heating element to pass rectified current therethrough for heating the same, at least part of said heating element having an appreciable temperature coefficient of impedance, means for electrically connecting at least a part of said temperature responsive impedance to said bridge as a part thereof such that alternating current is applied to said last mentioned part, means for connecting the input terminals of said bridge to said alternating current source, and means for connecting the output terminals of said bridge to said rectifier device to control the direct current output thereof.

9. A control circuit, a bridge having as one branch thereof a direct current load circuit, rectifier means controlled by said bridge and supplying direct current to said direct current load circuit, means for energizing said rectifier means and all branches of said bridge circuit with alternating current, said load circuit having an impedance responsive to temperature changes and controlling the output of said rectifier means accordingly.

10. A control circuit, a bridge having as one branch thereof a direct current load circuit, rectifier means controlled by said bridge, means for energizing said rectifier means and all branches of said bridge circuit with alternating current, and means for connecting said direct current load circuit in series with the output of said rectifier means to receive the rectified output therefrom.

GEORGE V. WOODLING.

References Cited in the file of this patent

UNITED STATES PATENTS

| Number | Name | Date |
| --- | --- | --- |
| 1,276,589 | Steinmetz | Aug. 20, 1918 |
| 1,457,851 | Nesbit | June 5, 1923 |
| 1,694,264 | Hull | Dec. 4, 1928 |
| 1,851,692 | Zucker | Mar. 29, 1932 |
| 1,870,022 | Prince | Aug. 2, 1932 |
| 1,943,088 | Power | Jan. 9, 1934 |
| 1,994,076 | Kiihle et al. | Mar. 12, 1935 |
| 2,079,690 | Grisdale | May 11, 1937 |

(Other references on following page)

UNITED STATES PATENTS

| Number | Name | Date |
|---|---|---|
| 2,083,382 | Jutson et al. | June 8, 1937 |
| 2,086,966 | Shrader | July 13, 1937 |
| 2,093,745 | Westell | Sept. 21, 1937 |
| 2,119,680 | Long | June 7, 1938 |
| 2,126,398 | Knowles | Aug. 9, 1938 |
| 2,163,297 | Waage | June 20, 1939 |
| 2,278,633 | Bagnall | Apr. 7, 1942 |
| 2,315,619 | Hutcheson et al. | Apr. 6, 1943 |
| 2,427,379 | Ashbaugh | Sept. 16, 1947 |
| 2,429,453 | Crowley | Oct. 21, 1947 |
| 2,462,207 | Mershon | Feb. 22, 1949 |
| 2,467,856 | Rich | Apr. 19, 1949 |
| 2,468,080 | Klemperer | Apr. 26, 1949 |
| 2,475,309 | Chalberg | July 5, 1949 |

OTHER REFERENCES

Hull, "Hot-Cathode Thyratrons," General Electric Review, vol. 32, No. 7, July 1929, pages 393, 394.